United States Patent
Toyama et al.

(10) Patent No.: US 7,018,722 B2
(45) Date of Patent: Mar. 28, 2006

(54) ALUMINUM ALLOY FIN MATERIAL FOR HEAT EXCHANGERS AND HEAT EXCHANGER INCLUDING THE FIN MATERIAL

(75) Inventors: Taketoshi Toyama, Anjo (JP); Koji Hirao, Nishio (JP); Takashi Hatori, Kariya (JP); Yuji Hisatomi, Kasugai (JP); Yasunaga Itoh, Nagoya (JP); Yoshifusa Shoji, Nagoya (JP)

(73) Assignees: Denso Corporation, Kariya (JP); Sumitomo Light Metal Industries, Ltd., Tokyo (JP)

( * ) Notice: Subject to any disclaimer, the term of this patent is extended or adjusted under 35 U.S.C. 154(b) by 266 days.

(21) Appl. No.: 10/601,752

(22) Filed: Jun. 23, 2003

(65) Prior Publication Data

US 2004/0028940 A1 Feb. 12, 2004

(30) Foreign Application Priority Data

Jun. 24, 2002 (JP) ............................. 2002-182521
Apr. 15, 2003 (JP) ............................. 2003-109792

(51) Int. Cl.
*B32B 15/20* (2006.01)
*F28F 21/08* (2006.01)
*C22C 21/04* (2006.01)

(52) U.S. Cl. ...................... 428/654; 428/925; 165/905; 228/262.51

(58) Field of Classification Search ................ 428/654, 428/925; 165/905; 228/183, 262.51
See application file for complete search history.

(56) References Cited

U.S. PATENT DOCUMENTS 4,908,184 A * 3/1990 Kaifu et al. ................. 420/534
6,620,265 B1 * 9/2003 Kawahara et al. .......... 148/551
6,627,330 B1 * 9/2003 Shimizu et al. ............. 428/654

FOREIGN PATENT DOCUMENTS

JP 11-131166 * 5/1999
JP 2002-155332 * 5/2002

* cited by examiner

*Primary Examiner*—John J. Zimmerman
(74) *Attorney, Agent, or Firm*—Flynn, Thiel, Boutell & Tanis, P.C.

(57) ABSTRACT

The present invention provides an aluminum alloy fin material for heat exchangers which has a thickness of 80 μm (0.08 mm) or less and excels in joinability to a tube material and in intergranular corrosion resistance. The aluminum alloy fin material is an aluminum alloy bare fin material or a brazing fin material which has a thickness of 80 μm or less and is incorporated into a heat exchanger made of an aluminum alloy manufactured by brazing through an Al—Si alloy filler metal. The structure of the core material before brazing is a fiber structure, and the crystal grain diameter of the structure after brazing is 50–250 μm. The Si concentration in the Si dissolution area on the surface of the fin material and at the center of the thickness of the fin material after brazing is preferably 0.8% or more and 0.7% or less, respectively.

11 Claims, No Drawings

ALUMINUM ALLOY FIN MATERIAL FOR HEAT EXCHANGERS AND HEAT EXCHANGER INCLUDING THE FIN MATERIAL

BACKGROUND OF THE INVENTION

1. Field of the Invention

The present invention relates to an aluminum alloy fin material for heat exchangers. More particularly, the present invention relates to an aluminum alloy fin material for heat exchangers made of an aluminum alloy, which is manufactured by joining a fin and a constituent material for a working fluid passage by brazing, such as a radiator, heater core, oil cooler, intercooler, and condenser and evaporator for a car air-conditioner, in particular, to an aluminum alloy fin material excelling in intergranular corrosion resistance and joinability, and to a heat exchanger including the fin material.

2. Description of Background Art

A heat exchanger made of an aluminum alloy is widely used as an automotive heat exchanger such as a radiator, heater core, oil cooler, intercooler, and evaporator and condenser for a car air-conditioner. The heat exchanger made of an aluminum alloy is assembled by combining an aluminum alloy fin material with an extruded flattened tube (working fluid passage material) made of an Al—Cu alloy, Al—Mn alloy, Al—Mn—Cu alloy, or the like, or with a tube obtained by forming a brazing sheet in which a filler metal is clad on the above alloy in a tubular shape, and brazing the combined product by flux brazing using a chloride flux, inert gas atmosphere brazing using a fluoride flux, or vacuum brazing through a filler metal.

As the filler metal, an Al—Si filler metal is used. The filler metal is disposed on the side of the working fluid passage material, or either one side or both sides of the fin material. The fin material for a heat exchanger made of an aluminum alloy is required to have a sacrificial anode effect in order to protect the working fluid passage material against corrosion, and to have high-temperature buckling resistance (high-temperature sagging resistance) in order to prevent deformation or erosion caused by the filler metal during high-temperature heating for brazing.

In order to satisfy such demands, an Al—Mn alloy such as JIS A3003 and JIS A3203 has been used as the aluminum alloy fin material. Japanese Patent Publication No. 56-12395 proposes providing the sacrificial anode effect to the fin material by making the Al—Mn alloy electrochemically anodic (less noble) by the addition of Zn, Sn, In, and the like. Japanese Patent Publication No. 57-13787 proposes improving sagging resistance by the addition of Cr, Ti, and Zr.

Japanese Patent Application Laid-open No. 2002-155332 proposes making the structure of the aluminum alloy fin material before brazing fibrous in order to improve brazability by improving formability of the fin material into a corrugated fin. This method is effective in improving formability. However, this method has a problem in which the joining rate by brazing is decreased as the crystal grain diameter after brazing is increased, and buckling occurs if the crystal grain diameter is small.

In recent years, reduction of the weight of the automotive heat exchanger has been demanded in order to further reduce the weight of the vehicle. To deal with this demand, reduction of the thickness of the constituent materials for the heat exchanger, such as the fin material and the working fluid passage material (tube material), has progressed. However, in the case of reducing the thickness of the fin material on which the filler metal is clad, since the amount of filler metal flowing toward the braze joint is decreased, a shortage or excessive melting of the filler metal occurs at the joint.

In the heat exchanger made of an aluminum alloy, in order to mainly provide the fin material with an effect as a sacrificial anode material which protects the tube material against corrosion, a material design which allows the fin material to corrode has been taken into consideration. However, a problem occurs in the case of using a constituent material having a reduced thickness, in particular, an aluminum alloy fin material having a thickness of 0.08 mm or less. In the case of using a brazing fin material on which the filler metal is clad, the molten filler metal on both sides of the fin material penetrates into the grain boundaries in the entire area in the direction of the sheet thickness. This causes anodic (less noble) components to be formed at the grain boundaries, whereby intergranular corrosion easily occurs. If intergranular corrosion significantly occurs in the fin material, the strength of the heat exchanger core is decreased. In the case of using a bare fin material on which the filler metal is not clad, the filler metal on the side of the tube combined with the fin material penetrates into the braze joint between the tube and the fin, whereby intergranular corrosion easily occurs. If intergranular corrosion significantly occurs in the fin material, the strength of the heat exchanger core is decreased. Therefore, these fin materials are required to exhibit corrosion resistance while protecting the tube material against corrosion.

SUMMARY OF THE INVENTION

The present invention has been achieved as a result of studies into the relation between joinability by brazing and corrosion resistance, in particular, intergranular corrosion resistance and the alloy composition, internal structure, and the like in order to obtain an aluminum alloy fin material capable of solving the above problems accompanied by a reduction of the thickness of the aluminum alloy fin material for heat exchangers, and satisfying the above demand for improvement. Accordingly, an object of the present invention is to provide an aluminum alloy fin material for heat exchangers excelling in joinability to a tube material and in intergranular corrosion resistance, and a heat exchanger made of an aluminum alloy including the aluminum alloy fin material.

An aluminum alloy fin material for heat exchangers and a heat exchanger according to the present invention to achieve the above object have the following features.

(1) An aluminum alloy fin material which has a thickness of 80 μm or less and is incorporated into a heat exchanger made of an aluminum alloy manufactured by brazing through an Al—Si alloy filler metal, wherein the structure of the fin material before brazing is a fiber structure, and the crystal grain diameter of the structure of the fin material after brazing is 50–250 μm.

(2) An aluminum alloy fin material comprising the fin material as defined in the above (1) as a core material, and an Al—Si alloy filler metal clad on both sides of the core material.

(3) In the fin material as defined in the above (1), the Si concentration in an Si dissolution area in a brazed section at the center of the thickness of the fin material after brazing may be 0.7% or less.

(4) In the fin material as defined in the above (2), the Si concentration in an Si dissolution area in a brazed section on the surface of the fin material and at the center of the thickness of the fin material after brazing may be 0.8% or more and 0.7% or less, respectively.

(5) In the fin material as defined in any of the above (1) to (4), the fin material may be made of an aluminum alloy which comprises 0.8–2.0% of Mn, 0.05–0.8% of Fe, 1.5% or less of Si, 0.2% or less of Cu, and 0.5–4% of Zn, with the balance being Al and impurities.

(6) In the aluminum alloy fin material as defined in the above (2) or (4), the fin material may be made of an aluminum alloy which comprises 0.8–2.0% of Mn, 0.05–0.8% of Fe, 1.5% or less of Si, 0.2% or less of Cu, and 0.5–4% of Zn with the balance being Al and impurities, and the filler metal may be made of an aluminum alloy which comprises 6–13% of Si with the balance being Al and impurities, the filler metal being clad on each side of the core material respectively at a thickness of 3–20% of the total thickness of the fin material and the filler metal.

(7) In the fin material as defined in the above (5), the Cu content in the fin material may be 0.03% or less.

(8) In the fin material as defined in the above (6), the core material may comprise 0.03% or less of Cu, and the filler metal may comprise 0.1% or less of Cu.

(9) In the fin material as defined in the above (5) or (7), the fin material may further comprise at least one of 0.05–0.3% of Zr and 0.05–0.3% of Cr.

(10) In the fin material as defined in the above (6) or (8), the core material may further comprise at least one of 0.05–0.3% of Zr and 0.05–0.3% of Cr.

(11) In the fin material as defined in the above (6), (8), or (10), the filler metal may further comprise 0.5–6% of Zn.

(12) A heat exchanger comprising the aluminum alloy fin material as defined in any of the above (1) to (11) which is joined by brazing.

DETAILED DESCRIPTION OF PREFERRED EMBODIMENT (1) The internal structure, (2) crystal grain diameter, (3) Si concentration, and (4) alloy components of the aluminum alloy fin material for heat exchangers of the present invention are described below.

(1) Internal Structure

In the case of using a bare fin material or a brazing fin material having a thickness of 80 μm (0.08 mm) or less, if the core material (hereinafter called "fin substrate") has a recrystallization structure, the strength varies between the grain boundaries having a lot of vacancies and the inside of the grains. This causes the shape of R-shaped portions to vary when corrugating the fin material. As a result, clearance between the fin and a refrigerant passage tube is increased when joining the core due to an increase in variation of the height of the fin ridges, whereby the joining rate by brazing is decreased. However, variation of the shape during corrugating and variation of the height of the fin ridges are decreased by making the internal structure of the fin substrate fibrous and reducing the distribution of variation of the strength, whereby the joining rate is increased.

(2) Crystal Grain Diameter

Conventionally, it is considered that the recrystallization grain diameter of the fin material after heating for brazing is preferably larger in order to improve characteristics of the fin material, unless significant erosion occurs at the subgrain boundaries because recrystallization is not completed below the melting temperature of the filler metal. In the present invention, it is important to make the internal structure of the fin substrate fibrous and to limit the crystal grain diameter of the structure of the fin substrate after brazing to 50–250 μm. This remarkably increases the joining rate of the fin after brazing. If the crystal grain diameter of the structure of the fin substrate after brazing is less than 50 μm, the amount of molten filler metal which penetrates into the grain boundaries is increased, whereby the fin is buckled. If the crystal grain diameter exceeds 250 μm, a state in which a working strain before brazing is recovered continues at a high temperature. As a result, the amount of deformation of the fin is increased, whereby the height of the fin is decreased. This causes the joining rate of the fin and the refrigerant passage tube to be decreased. The crystal grain diameter of the structure of the core material after brazing is still more preferably 100–200 μm.

(3) Si Concentration

Intergranular corrosion resistance of the heat exchanger core after brazing is remarkably improved by limiting the Si concentration in the Si dissolution area on the surface of the fin material and at the center of the thickness of the fin material after brazing within the range of the present invention. Specifically, in the case of using a brazing fin material including a core material and a filler metal clad on the core material, Si in the filler metal is diffused into the core material along the crystal grain boundaries of the core material during heating for brazing. If the thickness of the fin material is as thin as 0.08 mm or less, in the case where the heating cycle for brazing is increased, the concentration of Si which is diffused into the core material from the filler metal tends to be increased to the solubility limit at the heating temperature for brazing. Therefore, the Si concentration is increased at the grain boundaries of the core material, whereby a region having a low Si concentration is formed near the grain boundaries. Since the potential of such a region is anodic (less noble), intergranular corrosion tends to occur in the fin material. In the case of using a bare fin material, the same phenomenon as in the case of using a brazing fin material is caused by a filler metal on the side of the tube at the joint between the fin material and the tube.

In the case of using a brazing fin material, Si present at the center of the thickness of the fin material rarely precipitates at the grain boundaries because the Si concentration in the Si dissolution area on the surface of the fin material after brazing is limited to 0.8% or more and the Si concentration in the Si dissolution area at the center of the thickness of the fin material after brazing is limited to 0.7% or less. Therefore, the grain boundaries on the surface of the fin material preferentially corrode and corrosion toward the inside of the fin material progresses as uniform corrosion, whereby occurrence of intergranular corrosion of the fin material is controlled. In the case where the thickness of the fin material exceeds 0.08 mm, since Si in the filler metal is not diffused into the inside of the fin material, intergranular corrosion does not occur.

In the case of using a bare fin material, Si present at the center of the thickness of the fin material rarely precipitates at the grain boundaries because the Si concentration in the Si dissolution area at the center of the thickness of the fin material after brazing is limited to 0.7% or less. Therefore, the grain boundaries on the surface of the fin material preferentially corrode and corrosion toward the inside of the fin material progresses as uniform corrosion, whereby occurrence of intergranular corrosion in the fin material is controlled. In the case where the thickness of the fin material exceeds 0.08 mm, since Si in the filler metal is not diffused into the inside of the fin material, intergranular corrosion does not occur.

(4) Alloy Component

The significance and reasons for limitation of the alloy components in the present invention are described below.

(Fin Substrate)

Mn in the fin substrate increases strength of the core material to improve high-temperature buckling resistance. The Mn content is preferably 0.8–2.0%. If the Mn content is less than 0.8%, the effect is insufficient. If the Mn content exceeds 2.0%, coarse crystallized products are produced during casting, whereby rolling workability is impaired. As a result, it is difficult to manufacture a sheet material. The Mn content is still more preferably 1.0–1.7%.

Fe in the fin substrate coexists with Mn and increases strength of the fin material before and after brazing. The Fe content is preferably 0.05–0.8%. If the Fe content is less than 0.05%, the effect is insufficient. If the Fe content exceeds 0.8%, crystal grains are refined, whereby a molten filler metal tends to erode the core material. As a result, high-temperature buckling resistance is decreased and self-corrosiveness is increased. The Fe content is still more preferably 0.05–0.3%.

Si in the fin substrate binds to Mn and produces fine Al—Mn—Si compounds, thereby increasing strength of the fin material. Moreover, Si decreases the amount of dissolved Mn to improve thermal conductivity (electrical conductivity). The Si content is preferably 0.01–1.6%. If the Si content is less than 0.01%, the effect is insufficient. If the Si content exceeds 1.6%, a large amount of Si exists at the grain boundaries to cause a low Si concentration region to be formed near the grain boundaries, whereby intergranular corrosion tends to occur. The Si content is still more preferably 0.1–0.9%.

Cu in the fin substrate increases strength of the fin material before and after brazing. However, Cu decreases intergranular corrosion resistance. The Cu content is preferably 0.2% or less. If the Cu content exceeds 0.2%, the potential of the fin material becomes cathodic (noble), whereby the sacrificial anode effect of the fin is decreased. Moreover, intergranular corrosion resistance is decreased. The Cu content is more preferably 0.03% or less, and still more preferably 0.01% or less.

Zn in the fin substrate causes the potential of the core material to be anodic (less noble) to increase the sacrificial anode effect. The Zn content is preferably 0.5–4.0%. If the Zn content is less than 0.5%, the effect is insufficient. If the Zn content exceeds 4.0%, self-corrosion resistance of the core material is decreased and intergranular corrosion susceptibility is increased. The Zn content is still more preferably 1.0–3.0%.

Zr and Cr in the fin substrate increase strength of the fin material before and after brazing and improve high-temperature buckling resistance. The Zr content and the Cr content are preferably 0.05–0.3%. If the content is less than 0.05%, the effect is insufficient. If the content exceeds 0.3%, coarse crystallized products are produced during casting, whereby rolling workability is impaired. As a result, it is difficult to manufacture a sheet material.

In, Sn, and Ga may be added to the fin substrate in an amount of 0.3% or less, respectively. These elements cause the potential of the fin material to be anodic (less noble) without substantially decreasing thermal conductivity of the fin material to provide a sacrificial anode effect. The effects of the present invention are not impaired if the fin substrate contains Pb, Li, Sr, Ca, and Na respectively in an amount of 0.1% or less. V, Mo and Ni may be added to the fin substrate respectively in an amount of 0.3% or less in order to increase the strength. Ti may be added to the fin substrate in an amount of 0.3% or less in order to refine the cast structure. B may be added to the fin substrate in an amount of 0.1% or less in order to prevent occurrence of oxidation. In the case of applying vacuum brazing as the brazing method, 0.5% or less of Mg may be added to the fin substrate in order to increase strength of the core material.

(Filler Metal)

Si in the filler metal decreases the melting point of the filler metal to increase flowability of the molten filler metal. The Si content is preferably 6–13%. If the Si content is less than 6%, the effect is insufficient. If the Si content exceeds 13%, the melting point of the filler metal increases rapidly, and workability during the manufacture is decreased. The Si content is still more preferably 7–11%.

Zn in the filler metal increases the sacrificial anode effect. The Zn content is preferably 0.5–6%. If the Zn content is less than 0.5%, the effect is insufficient. If the Zn content exceeds 6%, workability during the manufacture is decreased. Moreover, the spontaneous potential becomes anodic (less noble), whereby self-corrosion resistance is increased.

The effects of the present invention are not impaired if the filler metal contains Cr, Cu, and Mn respectively in an amount of 0.3% or less and Pb, Li, and Ca respectively in an amount of 0.1% or less. 0.3% or less of Ti and 0.01% or less of B may be added to the filler metal in order to refine the cast structure. Sr and Na may be added to the filler metal respectively in an amount of 0.1% or less in order to refine Si particles in the filler metal. In, Sn, and Ga may be added to the filler metal respectively in an amount of 0.1% or less in order to decrease the potential to provide the sacrificial anode effect. 0.1% or less of Be may be added to the filler metal in order to prevent growth of a surface oxide film. 0.4% or less of Bi may be added to the filler metal in order to improve flowability of the filler metal.

If the filler metal contains a large amount of Fe, self-corrosion tends to occur. Therefore, the Fe content is preferably limited to 0.8% or less. In the case of applying vacuum brazing, Mg is added to the filler metal in an amount of 2.0% or less. In the case of applying inert atmosphere brazing using a fluoride flux, the Mg content is preferably limited to 0.5% or less since Mg hinders brazability.

The cladding rate of the filler metal in the brazing fin material is preferably 3–20% on average on one side in the case of using a fin material having a thickness of 80 μm (0.08 mm) or less. If the average cladding rate on one side is less than 3%, the thickness of the filler metal clad on the core material is too small, whereby a uniform cladding rate cannot be obtained. As a result, it is difficult to manufacture a fin material on which the filler metal is clad. If the average cladding rate exceeds 20%, the amount of molten filler metal is excessively increased, whereby the core material tends to be dissolved and eroded. The cladding rate is still more preferably 5–15%.

The aluminum alloy fin material for heat exchangers of the present invention is manufactured as follows. In the case of manufacturing a bare fin material, an aluminum alloy for a fin substrate having a specific composition is cast by semicontinuous casting and homogenized according to a conventional method. The homogenized product is subjected to hot rolling, annealing, and cold rolling, or to hot rolling, cold rolling, annealing, and final cold rolling to obtain a sheet material having a thickness of 0.08 mm (80 μm) or less. The sheet material is slit at a specific width and corrugated. The corrugated product is combined with a tube obtained by forming a brazing sheet including an Al—Mn alloy such as a JIS3003 alloy as a core material in which an Al—Si alloy filler metal (outer side) and a JIS7072 alloy (inner side) are clad on each side of the core material, into a tubular shape. The corrugated product and the tube are joined by brazing to obtain a heat exchanger core.

In the case of manufacturing a brazing fin material, an aluminum alloy for a fin substrate (core material) and an aluminum alloy for a filler metal, each having a specific composition for making up the brazing fin material, are cast by semicontinuous casting and homogenized according to a conventional method. The filler metal is subjected to hot rolling and clad on the homogenized core material. The resulting product is subjected to hot rolling, annealing, and cold rolling, or to hot rolling, cold rolling, annealing, and final cold rolling to obtain a sheet material having a thickness of 0.08 mm (80 µm) or less. The sheet material is slit at a specific width and corrugated. The corrugated products and working fluid passage materials (inner tube materials) such as a flattened tube made of an Al—Mn alloy such as a JIS3003 alloy are alternatively layered and joined by brazing to obtain a heat exchanger core.

In the aluminum alloy fin material of the present invention, the fin substrate before brazing has a fiber structure and the crystal grain diameter of the structure of the fin substrate after brazing is limited to 50–250 µm, and preferably 100–200 µm. These structural properties can be obtained by adjusting the manufacturing conditions for the manufacturing steps of the fin material. For example, the fiber structure of the fin substrate is obtained by using a method of adjusting the annealing temperature during the manufacture of the fin material to a temperature lower than the recrystallization temperature of the aluminum alloy for the fin substrate, and adjusting the reduction ratio of cold rolling, for example. The crystal grain diameter of the structure of the fin substrate after brazing is limited to 50–250 µm by using a method of adjusting the conditions for process annealing and finish cold rolling or the like. For example, the ingot is homogenized at a temperature of 450–600° C. for three hours or more, and hot rolled at a temperature of 300–500° C. The hot-rolled product is cold rolled at a reduction ratio of 90% or more, annealed at a temperature of 280° C. or less, and cold rolled at a reduction ratio of 5–25%. The Si concentration in the Si dissolution area on the surface of the fin material and at the center of the thickness of the fin material after brazing is controlled by using a method of adjusting the heating cycle for brazing or the like. For example, a method of limiting the time of a series of brazing process including increasing the temperature from 450° C. or more to the brazing temperature (about 600° C.) and cooling to the solidification temperature of the filler metal to 15 minutes or less, and preferably 10 minutes or less can be given.

EXAMPLES

The present invention is described below by examples and comparative examples. These examples illustrate one embodiment of the present invention and should not be construed as limiting the present invention.

Example 1

Aluminum alloys for a core material and aluminum alloys for a filler metal, each having a composition shown in Table 1 (combinations Nos. A to Q), were cast by continuous casting and homogenized according to a conventional method. The ingots of the aluminum alloys for a filler metal were hot rolled and clad on each side of the ingots of the aluminum alloys for a core material. The resulting products were subjected to hot rolling, cold rolling, process annealing, and final cold rolling to obtain clad fin materials (temper H14) having a thickness of 0.07 mm and a cladding rate shown in Table 1. The structure of the core material and the crystal grain diameter of the recrystallization structure of the core material after heating for brazing were changed by adjusting the conditions for process annealing and final cold rolling.

The resulting fin materials were corrugated and attached to a tube material consisting of a porous flattened tube (50 stages) made of pure aluminum provided with a Zn surface treatment. The resulting products were combined with a header tank and a side plate provided with engaging sections in advance. After spraying with a fluoride flux, the products were subjected to inert atmosphere brazing at 600° C. (maximum temperature). The Si concentration in the Si dissolution area on the surface of the fin material and at the center of the thickness of the fin material after brazing was changed by adjusting the heating cycle during brazing.

TABLE 1

| Com-bination | Core material Composition (wt %) | | | | | | Filler metal Composition (wt %) | | Cladding rate (one side) (%) |
|---|---|---|---|---|---|---|---|---|---|
| | Mn | Fe | Si | Cu | Zn | Other | Si | Other | |
| A | 0.8 | 0.2 | 0.5 | 0.00 | 2.5 | — | 7.5 | — | 10 |
| B | 1.0 | 0.2 | 0.5 | 0.01 | 2.5 | — | 7.5 | — | 10 |
| C | 1.6 | 0.2 | 0.5 | 0.01 | 2.5 | Cr 0.05 | 7.5 | — | 10 |
| D | 2.0 | 0.2 | 0.5 | 0.03 | 2.5 | — | 7.5 | Zn 0.5 | 10 |
| E | 1.2 | 0.06 | 0.5 | 0.14 | 2.5 | Cr 0.3 | 7.5 | Zn 6.0 | 10 |
| F | 1.2 | 0.3 | 0.5 | 0.12 | 2.5 | Zr 0.05 | 7.5 | — | 10 |
| G | 1.2 | 0.8 | 0.5 | 0.10 | 2.5 | Zr 0.3 | 7.5 | — | 10 |
| H | 1.2 | 0.2 | 0.05 | 0.12 | 2.5 | — | 7.5 | — | 10 |
| I | 1.2 | 0.2 | 0.9 | 0.03 | 2.5 | — | 7.5 | — | 10 |
| J | 1.2 | 0.2 | 1.5 | 0.02 | 2.5 | — | 6.0 | — | 10 |
| K | 1.2 | 0.2 | 0.5 | 0.20 | 2.5 | — | 13.0 | — | 10 |
| L | 1.2 | 0.2 | 0.5 | 0.03 | 2.5 | — | 7.5 | Cu 0.1 | 10 |
| M | 1.2 | 0.2 | 0.5 | 0.01 | 2.5 | — | 7.5 | Cu 0.04 | 3 |
| N | 1.2 | 0.2 | 0.5 | 0.00 | 0.5 | — | 7.5 | — | 5 |
| O | 1.2 | 0.2 | 0.5 | 0.00 | 4.0 | — | 7.5 | — | 15 |
| P | 1.2 | 0.2 | 0.5 | 0.01 | 1.0 | — | 7.5 | — | 20 |
| Q | 1.2 | 0.2 | 0.5 | 0.01 | 2.5 | — | 7.5 | — | 10 |

Test materials (combinations Nos. A to Q) were evaluated for the structure of the core material before brazing, the crystal grain diameter of the structure of the core material after brazing, the Si concentration in the Si dissolution area on the surface of the fin material and at the center of the thickness of the fin material after brazing, the joining rate by brazing, the presence or absence of buckling due to melting at the joint, intergranular corrosion resistance, and pitting-corrosion resistance of the tube material joined to the fin material according to the following methods. The evaluation results are shown in Table 2.

Structure of Core Material Before Brazing:

Whether or not the structure of the core material was recrystallized was judged from a surface polarization micrograph of the core material of the fin material.

Crystal Grain Diameter of Structure of Core Material After Brazing:

A surface polarization micrograph of the core material was taken. The number of crystal grains observed in the micrograph was counted, and a value obtained by converting the number of crystal grains into a circle equivalent diameter was used as the crystal grain diameter.

Si Concentration in Si Dissolution Area on the Surface of Fin Material and at the Center of Thickness of Fin Material After Brazing:

An area in which precipitates were not present was selected by using an electron probe microanalyser (EPMA). The Si concentration was measured at a beam diameter of 1 μm, and an average value at five points was calculated.

Joining Rate by Brazing:

A jig was pressed against the corrugated fin after heating for brazing to cause the fin to break (unjoined area was removed), and the surface of the tube and the joint of the fin were observed. The number of fin ridges which were not joined was counted to calculate the joining rate ((number of unjoined fin ridges/total number of corrugates)×100 (%)).

Presence or Absence of Buckling at Joint Due to Melting:

A representative area of the joint was collected and buried in a resin. Whether or not the joint was buckled due to melting was observed.

Intergranular Corrosion Resistance:

A core formed by joining the fin and the tube was subjected to a SWAAT corrosion test (ASTM G85-85) for four weeks. Breaking strength was then measured by performing a tensile test by holding the tubes on the upper and lower sides of the fin. The average strength was taken as an index for judgment of intergranular corrosion resistance of the fin material.

Pitting-corrosion Resistance of Tube Material:

Pitting-corrosion resistance of the tube material was evaluated by measuring the maximum depth of pitting corrosion that occurred in the tube during the corrosion test.

As shown in Table 2, test materials Nos. 1 to 17 according to the present invention exhibited excellent joinability by brazing in which the joining rate of the fin was 98% or more, and showed no buckling at the joint of the fin. Moreover, the average tensile strength of the fin was 50 MPa or more after the corrosion test. Furthermore, the test materials Nos. 1 to 17 showed an excellent pitting-corrosion resistance in which the maximum depth of pitting corrosion of the tube was less than 0.1 mm.

Comparative Example 1

Aluminum alloys for a core material and aluminum alloys for a filler metal, each having a composition shown in Table 3 (combinations Nos. a to o), were cast by continuous casting and homogenized according to a conventional method. The ingots of the aluminum alloys for a filler metal were hot rolled and clad on each side of the ingots of the aluminum alloys for a core material. The resulting products were subjected to hot rolling, cold rolling, process annealing, and final cold rolling to obtain clad fin materials (temper H14) having a thickness of 0.07 mm and a cladding rate shown in Table 3. The structure of the core material and the crystal grain diameter of the recrystallization structure of the core material after heating for brazing were changed by adjusting the conditions for process annealing and final cold rolling.

The resulting fin materials were corrugated and attached to a tube material consisting of a porous flattened tube (50 stages) made of pure aluminum provided with a Zn surface treatment in the same manner as in Example 1. The resulting products were combined with a header tank and a side plate provided with engaging sections in advance. After spraying with a fluoride flux, the products were subjected to inert atmosphere brazing at 600° C. (maximum temperature). The Si concentration in the Si dissolution area on the surface of the fin material and at the center of the thickness of the fin material after brazing was changed by adjusting the heating cycle during brazing.

TABLE 2

| Test material | Comb. | Core material Structure before brazing | Crystal grain diameter after brazing (μm) | Si concentration Center of thickness (%) | Si concentration Surface (%) | Joining rate (%) | Buckling | Intergranular corrosion resistance (Mpa) | Pitting corrosion resistance of tube (mm) |
|---|---|---|---|---|---|---|---|---|---|
| 1 | A | Fiber | 150 | 0.6 | 0.9 | 99.8 | None | 51 | 0.06 |
| 2 | B | Fiber | 150 | 0.4 | 1.0 | 99.7 | None | 52 | 0.05 |
| 3 | C | Fiber | 50 | 0.5 | 0.8 | 98.2 | None | 55 | 0.07 |
| 4 | D | Fiber | 100 | 0.6 | 0.8 | 99.5 | None | 54 | 0.08 |
| 5 | E | Fiber | 100 | 0.7 | 0.9 | 98.9 | None | 41 | 0.04 |
| 6 | F | Fiber | 150 | 0.6 | 1.0 | 99.0 | None | 44 | 0.09 |
| 7 | G | Fiber | 200 | 0.6 | 0.9 | 99.1 | None | 46 | 0.04 |
| 8 | H | Fiber | 150 | 0.4 | 0.9 | 98.5 | None | 40 | 0.06 |
| 9 | I | Fiber | 150 | 0.6 | 0.8 | 99.6 | None | 48 | 0.04 |
| 10 | J | Fiber | 150 | 0.7 | 0.9 | 99.2 | None | 50 | 0.06 |
| 11 | K | Fiber | 150 | 0.6 | 0.8 | 99.1 | None | 40 | 0.09 |
| 12 | L | Fiber | 250 | 0.5 | 0.8 | 99.9 | None | 51 | 0.08 |
| 13 | M | Fiber | 150 | 0.5 | 0.8 | 99.7 | None | 52 | 0.08 |
| 14 | N | Fiber | 150 | 0.6 | 1.0 | 99.4 | None | 50 | 0.08 |
| 15 | O | Fiber | 150 | 0.6 | 0.8 | 99.4 | None | 48 | 0.07 |
| 16 | P | Fiber | 150 | 0.7 | 0.9 | 99.6 | None | 53 | 0.06 |
| 17 | Q | Fiber | 100 | 0.6 | 0.9 | 99.9 | None | 55 | 0.04 |

TABLE 3

| Combination | Core material Composition (wt %) | | | | | | Filler metal Composition (wt %) | | Cladding rate (one side) (%) |
|---|---|---|---|---|---|---|---|---|---|
| | Mn | Fe | Si | Cu | Zn | Other | Si | Other | |
| a | 0.6 | 0.2 | 0.5 | 0.01 | 2.5 | — | 7.5 | Zn 7.0 | 10 |
| b | 1.2 | 0.2 | 0.5 | 0.10 | 2.5 | Cr 0.03 | 7.5 | — | 2 |
| c | 2.2 | 0.2 | 0.5 | 0.01 | 2.5 | — | 7.5 | — | 10 |
| d | 1.2 | 0.2 | 0.5 | 0.00 | 2.5 | Cr 0.4 | 7.5 | — | 10 |
| e | 1.2 | 0.9 | 0.5 | 0.14 | 2.5 | Zr 0.03 | 7.5 | — | 10 |
| f | 1.2 | 0.2 | 0.5 | 0.01 | 2.5 | Zr 0.4 | 7.5 | — | 10 |
| g | 1.2 | 0.2 | 1.7 | 0.00 | 2.5 | — | 7.5 | — | 10 |
| h | 1.2 | 0.2 | 0.5 | 0.30 | 2.5 | — | 7.5 | — | 25 |
| i | 1.2 | 0.2 | 0.5 | 0.12 | 2.5 | — | 5.0 | — | 10 |
| j | 1.2 | 0.2 | 0.5 | 0.12 | 0.3 | — | 14.0 | Cu 0.2 | 10 |
| k | 1.2 | 0.2 | 0.5 | 0.01 | 5.0 | — | 7.5 | — | 10 |
| l | 1.2 | 0.2 | 0.5 | 0.01 | 2.5 | — | 7.5 | — | 10 |
| m | 1.2 | 0.2 | 0.5 | 0.01 | 2.5 | — | 7.5 | — | 10 |
| n | 1.2 | 0.2 | 0.5 | 0.12 | 2.5 | — | 7.5 | — | 10 |
| o | 1.2 | 0.2 | 0.5 | 0.01 | 2.5 | — | 7.5 | — | 10 |

The test materials (combinations Nos. a to o) were evaluated for the structure of the core material before brazing, the crystal grain diameter of the structure of the core material after brazing, the Si concentration in the Si dissolution area on the surface of the fin material and at the center of the thickness of the fin material after brazing, the joining rate by brazing, the presence or absence of buckling due to melting at the joint, intergranular corrosion resistance, and pitting-corrosion resistance of the tube material joined to the fin material according to the same methods as in Example 1. The evaluation results are shown in Table 4.

whereby the fin had insufficient tensile strength. In test material No. 19, since the cladding rate of the filler metal was low, cracks occurred on the surface of the rolled fin material, whereby a clad fin material could not be manufactured. In test materials Nos. 20 and 21, coarse compounds were produced during casting due to high Mn content and high Cr content in the core material, respectively, whereby rolling workability was impaired. As a result, a sound fin material could not be manufactured.

In test material No. 22, the crystal grain diameter of the core material was decreased after brazing due to high Fe content in the core material. As a result, the molten filler metal penetrated into the crystal grain boundaries of the core material, whereby buckling occurred in the fin. In test material No. 23, coarse compounds were produced during casting due to high Zr content in the core material, whereby rolling workability was impaired. As a result, a sound fin material could not be manufactured. In test material No. 24, since the Si content in the core material was high, buckling occurred at the braze joint due to local melting. Moreover, since excessive molten Si was solidified at the crystal grain boundaries of the core material, tensile strength was insufficient after the corrosion test.

In test material No. 25, the core material was eroded since the amount of molten filler metal was increased due to high cladding rate of the filler metal. As a result, buckling occurred at the joint. Moreover, intergranular corrosion easily occurred due to high Cu content in the core material, whereby tensile strength of the fin was significantly decreased. In test material No. 26, since the amount of flowing filler metal was insufficient due to low Si content in the core material, the joining rate was insufficient. As a result, the corrosion test could not be carried out. In test material No. 27, the material broke during rolling due to high Si content in the filler metal. Moreover, the sacrificial

TABLE 4

| Test material | Comb. | Core material | | Si concentration | | Joining rate (%) | Buckling | Intergranular corrosion resistance (Mpa) | Pitting corrosion resistance of tube (mm) |
|---|---|---|---|---|---|---|---|---|---|
| | | Structure before brazing | Crystal grain diameter after brazing (μm) | Center of thickness (%) | Surface (%) | | | | |
| 18 | a | Fiber | 100 | 0.8 | 0.9 | 97.1 | None | 22 | 0.05 |
| 19 | b | — | — | — | — | — | — | — | — |
| 20 | c | — | — | — | — | — | — | — | — |
| 21 | d | — | — | — | — | — | — | — | — |
| 22 | e | Fiber | 30 | 0.6 | 0.9 | 99.2 | Occurred | 44 | 0.09 |
| 23 | f | — | — | — | — | — | — | — | — |
| 24 | g | Fiber | 150 | 0.7 | 1.0 | 99.8 | Occurred | 24 | 0.08 |
| 25 | h | Fiber | 100 | 0.6 | 1.0 | 99.2 | None | 9 | 0.09 |
| 26 | i | Fiber | 150 | 0.6 | 1.0 | 68.9 | None | — | — |
| 27 | j | Fiber | 100 | 0.5 | 1.0 | 99.5 | None | 28 | 0.21 |
| 28 | k | Fiber | 300 | 0.6 | 0.9 | 93.4 | None | 34 | 0.09 |
| 29 | l | Recrystallization | 100 | 0.7 | 0.8 | 94.8 | None | 50 | 0.07 |
| 30 | m | Fiber | 100 | 1.0 | 0.7 | 99.7 | None | 14 | 0.06 |
| 31 | n | Fiber | 150 | 0.9 | 0.7 | 98.1 | None | 21 | 0.04 |
| 32 | o | Fiber | 150 | 1.0 | 0.9 | 99.0 | None | 16 | 0.08 |

As shown in Table 4, in test material No. 18, since the Si concentration at the center of the thickness of the fin material after brazing was high, intergranular corrosion progressed, anode effect was insufficient due to low Zn content in the core material, whereby deep pitting corrosion occurred in the tube material.

In test material No. 28, since the crystal grain diameter of the core material after brazing was large, a state in which a strain during corrugating was recovered continued at a high temperature, whereby the amount of deformation of the fin was increased. As a result, joinability by brazing was insufficient. Moreover, since intergranular corrosion easily occurred due to high Zn content in the core material, tensile strength of the fin was decreased after the corrosion test. In test material No. 29, since the structure of the core material before brazing was a recrystallization structure, variation of the ridge height of the fin was increased during corrugating, whereby joinability by brazing was insufficient.

In test materials Nos. 30 and 31, since the Si concentration in the Si dissolution area on the surface of the fin material and at the center of the thickness of the fin material after brazing was inappropriate, tensile strength of the fin was insufficient after the corrosion test. In test material No. 32, since the Si concentration in the Si dissolution area at the center of the thickness of the fin material after brazing was high, tensile strength of the fin was insufficient after the corrosion test.

Example 2

Aluminum alloys having compositions shown in Table 5 (alloys Nos. 2A to 2Q) were cast by continuous casting and homogenized according to a conventional method. The homogenized products were subjected to hot rolling, cold rolling, process annealing, and final cold rolling to obtain bare fin materials (temper H14) having a thickness of 0.07 mm. The structure of the fin material and the crystal grain diameter of the recrystallization structure of the fin material after heating for brazing were changed by adjusting the conditions for process annealing and final cold rolling.

The resulting fin materials (test materials) were corrugated and attached to a tube material (50 stages) obtained by roll forming a brazing sheet (thickness: 0.2 mm) including a 3003 alloy as a core material, in which an Al-10% Si alloy filler metal (outer side) (cladding rate: 10%) and a 7072 alloy (inner sacrificial anode material) (cladding rate: 20%) were clad on each side of the core material, into a tubular shape. The resulting products were combined with a header tank and a side plate provided with engaging sections in advance. After spraying with a fluoride flux, the products were subjected to inert atmosphere brazing at 600° C. (maximum temperature). The Si concentration in the Si dissolution area at the center of the thickness of the fin material after brazing was changed by adjusting the heating cycle during brazing.

The test materials were evaluated for the structure of the core material before brazing, the crystal grain diameter of the structure of the core material after brazing, the Si concentration in the Si dissolution area at the center of the thickness of the fin material after brazing, the joining rate by brazing, the presence or absence of buckling due to melting at the joint, intergranular corrosion resistance, and pitting-corrosion resistance of the tube material joined to the fin material according to the same methods as in Example 1. The results are shown in Table 6.

TABLE 5

| | Composition (wt %) | | | | | |
|---|---|---|---|---|---|---|
| Alloy | Mn | Fe | Si | Cu | Zn | Other |
| 2A | 0.8 | 0.2 | 0.5 | 0.00 | 2.5 | — |
| 2B | 1.1 | 0.2 | 0.5 | 0.01 | 2.6 | — |
| 2C | 1.6 | 0.2 | 0.5 | 0.01 | 2.5 | Cr 0.06 |
| 2D | 2.0 | 0.2 | 0.5 | 0.03 | 2.4 | — |
| 2E | 1.2 | 0.06 | 0.5 | 0.14 | 2.5 | Cr 0.28 |
| 2F | 1.2 | 0.3 | 0.5 | 0.12 | 2.7 | Zr 0.05 |
| 2G | 1.2 | 0.7 | 0.5 | 0.10 | 2.5 | Zr 0.3 |
| 2H | 1.2 | 0.2 | 0.06 | 0.12 | 2.3 | — |
| 2I | 1.2 | 0.2 | 0.9 | 0.03 | 2.5 | — |
| 2J | 1.2 | 0.2 | 1.5 | 0.02 | 2.6 | — |
| 2K | 1.2 | 0.2 | 0.5 | 0.18 | 2.6 | — |
| 2L | 1.2 | 0.2 | 0.5 | 0.03 | 2.5 | — |
| 2M | 1.3 | 0.2 | 0.5 | 0.01 | 2.5 | — |
| 2N | 1.2 | 0.2 | 0.5 | 0.00 | 0.6 | — |
| 2O | 1.2 | 0.2 | 0.5 | 0.00 | 4.0 | — |
| 2P | 1.3 | 0.2 | 0.5 | 0.01 | 1.1 | — |
| 2Q | 1.2 | 0.2 | 0.5 | 0.01 | 2.5 | — |

TABLE 6

| Test material | Alloy | Fin material Structure before brazing | Crystal grain diameter after brazing (μm) | Si concentration at center of fin material thickness (%) | Joining rate (%) | Buckling | Intergranular corrosion resistance (Mpa) | Pitting corrosion resistance of tube (mm) |
|---|---|---|---|---|---|---|---|---|
| 33 | 2A | Fiber | 130 | 0.6 | 99.1 | None | 51 | 0.06 |
| 34 | 2B | Fiber | 150 | 0.4 | 99.2 | None | 52 | 0.05 |
| 35 | 2C | Fiber | 60 | 0.5 | 98.9 | None | 55 | 0.07 |
| 36 | 2D | Fiber | 90 | 0.6 | 99.1 | None | 54 | 0.08 |
| 37 | 2E | Fiber | 100 | 0.7 | 98.4 | None | 41 | 0.04 |
| 38 | 2F | Fiber | 170 | 0.6 | 99.4 | None | 44 | 0.09 |
| 39 | 2G | Fiber | 150 | 0.6 | 99.2 | None | 46 | 0.04 |
| 40 | 2H | Fiber | 200 | 0.4 | 98.9 | None | 40 | 0.06 |
| 41 | 2I | Fiber | 160 | 0.6 | 98.6 | None | 48 | 0.04 |
| 42 | 2J | Fiber | 140 | 0.7 | 98.2 | None | 50 | 0.06 |
| 43 | 2K | Fiber | 160 | 0.6 | 99.8 | None | 40 | 0.09 |
| 44 | 2L | Fiber | 230 | 0.5 | 99.4 | None | 51 | 0.08 |

TABLE 6-continued

| Test material | Alloy | Fin material Structure before brazing | Crystal grain diameter after brazing (μm) | Si concentration at center of fin material thickness (%) | Joining rate (%) | Buckling | Intergranular corrosion resistance (Mpa) | Pitting corrosion resistance of tube (mm) |
|---|---|---|---|---|---|---|---|---|
| 45 | 2M | Fiber | 150 | 0.5 | 99.4 | None | 52 | 0.08 |
| 46 | 2N | Fiber | 250 | 0.6 | 99.1 | None | 50 | 0.08 |
| 47 | 2O | Fiber | 200 | 0.6 | 99.7 | None | 48 | 0.07 |
| 48 | 2P | Fiber | 150 | 0.7 | 99.1 | None | 53 | 0.06 |
| 49 | 2Q | Fiber | 90 | 0.6 | 99.0 | None | 55 | 0.04 |

As shown in Table 6, test materials Nos. 33 to 49 according to the present invention exhibited excellent joinability by brazing in which the fin joining rate was 98% or more, and showed no buckling at the joint of the fin. Moreover, the average tensile strength of the fin was 50 MPa or more after the corrosion test. Furthermore, the test materials Nos. 33 to 49 showed an excellent pitting-corrosion resistance in which the maximum depth of pitting corrosion of the tube was less than 0.1 mm.

Comparative Example 2

Aluminum alloys having compositions shown in Table 7 (alloys Nos. 2a to 2o) were cast by continuous casting and homogenized according to a conventional method. The homogenized products were subjected to hot rolling, cold rolling, process annealing, and final cold rolling to obtain bare fin materials (temper H14) having a thickness of 0.07 mm. The structure of the fin material and the crystal grain diameter of the recrystallization structure of the fin material after heating for brazing were changed by adjusting the conditions for process annealing and final cold rolling.

The resulting fin materials (test materials) were corrugated and attached to a tube material (50 stages) obtained by roll forming a brazing sheet (thickness: 0.2 mm) including a 3003 alloy as a core material, in which an Al-10% Si alloy filler metal (outer side) (cladding rate: 10%) and a 7072 alloy (inner sacrificial anode material) (cladding rate: 20%) were clad on each side of the core material, into a tubular shape. The resulting products were combined with a header tank and a side plate provided with engaging sections in advance. After spraying with a fluoride flux, the products were subjected to inert atmosphere brazing at 600° C. (maximum temperature). The Si concentration in the Si dissolution area at the center of the thickness of the fin material after brazing was changed by adjusting the heating cycle during brazing.

The test materials were evaluated for the structure of the core material before brazing, the crystal grain diameter of the structure of the core material after brazing, the Si concentration in the Si dissolution area at the center of the thickness of the fin material after brazing, the joining rate by brazing, the presence or absence of buckling due to melting at the joint, intergranular corrosion resistance, and pitting-corrosion resistance of the tube material joined to the fin material according to the same methods as in Example 1. The results are shown in Table 8.

TABLE 7

| | Composition (wt %) | | | | | |
|---|---|---|---|---|---|---|
| Alloy | Mn | Fe | Si | Cu | Zn | Other |
| 2a | 0.6 | 0.2 | 0.5 | 0.01 | 2.5 | — |
| 2b | 2.1 | 0.2 | 0.5 | 0.01 | 2.5 | — |
| 2c | 1.2 | 0.2 | 0.5 | 0.00 | 2.6 | Cr 0.4 |
| 2d | 1.2 | 0.9 | 0.5 | 0.14 | 2.5 | Zr 0.03 |
| 2e | 1.2 | 0.2 | 0.6 | 0.01 | 2.4 | Zr 0.4 |
| 2f | 1.2 | 0.2 | 1.8 | 0.00 | 2.6 | — |
| 2g | 1.2 | 0.2 | 0.5 | 0.32 | 2.5 | — |
| 2h | 1.2 | 0.2 | 0.5 | 0.12 | 0.3 | — |
| 2i | 1.3 | 0.2 | 0.6 | 0.01 | 5.0 | — |
| 2j | 1.2 | 0.2 | 0.5 | 0.01 | 2.5 | — |
| 2k | 1.3 | 0.2 | 0.5 | 0.01 | 2.5 | — |
| 2l | 1.3 | 0.2 | 0.4 | 0.12 | 2.5 | — |
| 2m | 1.2 | 0.2 | 0.4 | 0.01 | 2.5 | — |

TABLE 8

| Test material | Alloy | Fin material Structure before brazing | Crystal grain diameter after brazing (μm) | Si concentration at center of fin material thickness (%) | Joining rate (%) | Buckling | Intergranular corrosion resistance (Mpa) | Pitting corrosion resistance of tube (mm) |
|---|---|---|---|---|---|---|---|---|
| 50 | 2a | Fiber | 100 | 0.7 | 96.5 | None | 22 | 0.05 |
| 51 | 2b | — | — | — | — | — | — | — |
| 52 | 2c | — | — | — | — | — | — | — |
| 53 | 2d | Fiber | 30 | 0.5 | 99.4 | Occurred | 44 | 0.08 |
| 54 | 2e | — | — | — | — | — | — | — |
| 55 | 2f | Fiber | 150 | 0.6 | 99.0 | Occurred | 22 | 0.08 |

TABLE 8-continued

| Test material | Alloy | Fin material Structure before brazing | Crystal grain diameter after brazing (μm) | Si concentration at center of fin material thickness (%) | Joining rate (%) | Buckling | Intergranular corrosion resistance (Mpa) | Pitting corrosion resistance of tube (mm) |
|---|---|---|---|---|---|---|---|---|
| 56 | 2g | Fiber | 150 | 0.5 | 99.5 | None | 11 | 0.09 |
| 57 | 2h | Fiber | 130 | 0.5 | 99.0 | None | 31 | 0.22 |
| 58 | 2i | Fiber | 300 | 0.7 | 90.2 | None | 28 | 0.08 |
| 59 | 2j | Recrystallization | 100 | 0.6 | 95.8 | None | 50 | 0.09 |
| 60 | 2k | Fiber | 100 | 1.0 | 98.5 | None | 18 | 0.06 |
| 61 | 2l | Fiber | 150 | 0.9 | 99.7 | None | 18 | 0.04 |
| 62 | 2m | Fiber | 130 | 1.1 | 99.3 | None | 11 | 0.09 |

As shown in Table 8, test material No. 50 showed insufficient strength as the fin material due to low Mn content in the fin material, thereby resulting in insufficient high-temperature buckling resistance. In test materials Nos. 51 and 52, coarse compounds were produced during casting due to high Mn content and high Cr content in the fin material, respectively, whereby rolling workability was impaired. As a result, a sound fin material could not be manufactured.

In test material No. 53, the crystal grain diameter of the fin material was decreased after brazing due to high Fe content in the fin material. As a result, the molten filler metal penetrated into the crystal grain boundaries of the fin material, whereby buckling occurred in the fin. In test material No. 54, coarse compounds were produced during casting due to high Zr content in the fin material, whereby rolling workability was impaired. As a result, a sound fin material could not be manufactured. In test material No. 55, since the Si content in the fin material was high, buckling occurred at the braze joint due to local melting. Moreover, since excessive molten Si was solidified at the crystal grain boundaries of the fin material, tensile strength was insufficient after the intergranular corrosion test.

In test material No. 56, intergranular corrosion easily occurred due to high Cu content in the fin material, whereby tensile strength of the fin was significantly decreased. In test material No. 57, the sacrificial anode effect was insufficient due to low Zn content in the fin material, whereby deep pitting corrosion occurred in the tube material. In test material No. 58, since the crystal grain diameter of the fin material after brazing was large, a state in which a strain during corrugating was recovered continued at a high temperature, whereby the amount of deformation of the fin was increased. As a result, joinability by brazing was insufficient. Moreover, intergranular corrosion easily occurred due to high Zn content in the fin material, whereby tensile strength of the fin was significantly decreased after the corrosion test.

In test material No. 59, since the structure of the fin material before brazing was a recrystallization structure, variation of the ridge height of the fin was increased during corrugating, thereby resulting in insufficient joinability by brazing. In test materials Nos. 60 to 62, since the Si concentration in the Si dissolution area at the center of the thickness of the fin material after brazing was high, tensile strength of the fin was insufficient after the intergranular corrosion test.

According to the present invention, an aluminum alloy fin material for heat exchangers having a thickness of 80 μm (0.08 mm) and excelling in joinability to a tube material and in intergranular corrosion resistance is provided. According to this aluminum alloy fin material for heat exchangers, the thickness of the fin material can be reduced, whereby reduction of the weight and an increase in life expectancy of the heat exchangers can be achieved.

Obviously, numerous modifications and variations of the present invention are possible in light of the above teachings. It is therefore to be understood that, within the scope of the appended claims, the invention may be practiced otherwise than as specifically described herein.

What is claimed is:

1. An aluminum alloy fin material for heat exchangers which has a thickness of no greater than 80 μm and is incorporated into a heat exchanger made of an aluminum alloy manufactured by brazing through an Al—Si alloy filler metal, wherein the structure of the fin material before brazing is a fiber structure, the crystal grain diameter of the structure of the fin material after brazing is 50–250 μm and the Si concentration in an Si dissolution area in a brazed section at the center of the thickness of the fin material after brazing is no greater than 0.7 mass %.

2. An aluminum alloy fin material for heat exchangers comprising the fin material as defined in claim 1 as a core material and an Al—Si alloy filler metal clad on both sides of the core material.

3. The aluminum alloy fin material for heat exchangers as defined in claim 2, wherein the Si concentration in an Si dissolution area in a brazed section on the surface of the fin material after brazing is at least 0.8 mass %.

4. A heat exchanger comprising the aluminum alloy fin material as defined in claim 1 which is joined by brazing.

5. An aluminum alloy fin material for heat exchangers which has a thickness of no greater than 80 μm and is incorporated into a heat exchanger made of an aluminum alloy manufactured by brazing through an Al—Si alloy filler metal, wherein the fin material is made of an aluminum alloy comprising 0.82–2.0 mass % of Mn, 0.05–0.8 mass % of Fe, Si in an amount not exceeding 1.5 mass %, Cu in an amount not exceeding 0.2 mass % and 0.5–4 mass % of Zn, with the balance being Al and impurities, the structure of the fin material before brazing is a fiber structure and the crystal grain diameter of the structure of the fin material after brazing is 50–250 μm.

6. The aluminum alloy fin material for heat exchangers as defined in claim 5, wherein the Cu content in the fin material is 0.03% or less.

7. The aluminum alloy fin material for heat exchangers as defined in claim 5, wherein the fin material further comprises at least one of 0.05–0.3% of Zr and 0.05–0.3% of Cr.

8. An aluminum alloy fin material for heat exchangers which has a thickness of no greater than 80 μm and is incorporated into a heat exchanger made of an aluminum alloy manufactured by brazing through an Al—Si alloy filler metal, wherein a core material comprises the fin material, an Al—Si alloy filler material is clad on both sides of the core material, the structure of the fin material before brazing is a fiber structure, the crystal grain diameter of the structure of the fin material after brazing is 50–250 μm, the fin material is made of an aluminum alloy which comprises 0.8–2.0 mass % of Mn, 0.05–0.8 mass % of Fe, no more than 1.5 mass % of Si and 0.5–4 mass % of Zn, with the balance being Al and impurities, and the filler metal is clad on each side of the core material respectively at a thickness of 3–20% of the total thickness of the fin material and the filler metal.

9. The aluminum alloy fin material for heat exchangers as defined in claim 8, wherein the core material comprises 0.03% or less of Cu, and the filler metal comprises 0.1% or less of Cu.

10. The aluminum alloy fin material for heat exchangers as defined in claim 8, wherein the core material further comprises at least one of 0.05–0.3% of Zr and 0.05–0.3% of Cr.

11. The aluminum alloy fin material for heat exchangers as defined in claim 8, wherein the filler metal further comprises 0.5–6% of Zn.

* * * * *